May 29, 1928.
C. T. DICKEY
1,671,764
SPRING SHACKLE
Filed Sept. 7, 1926
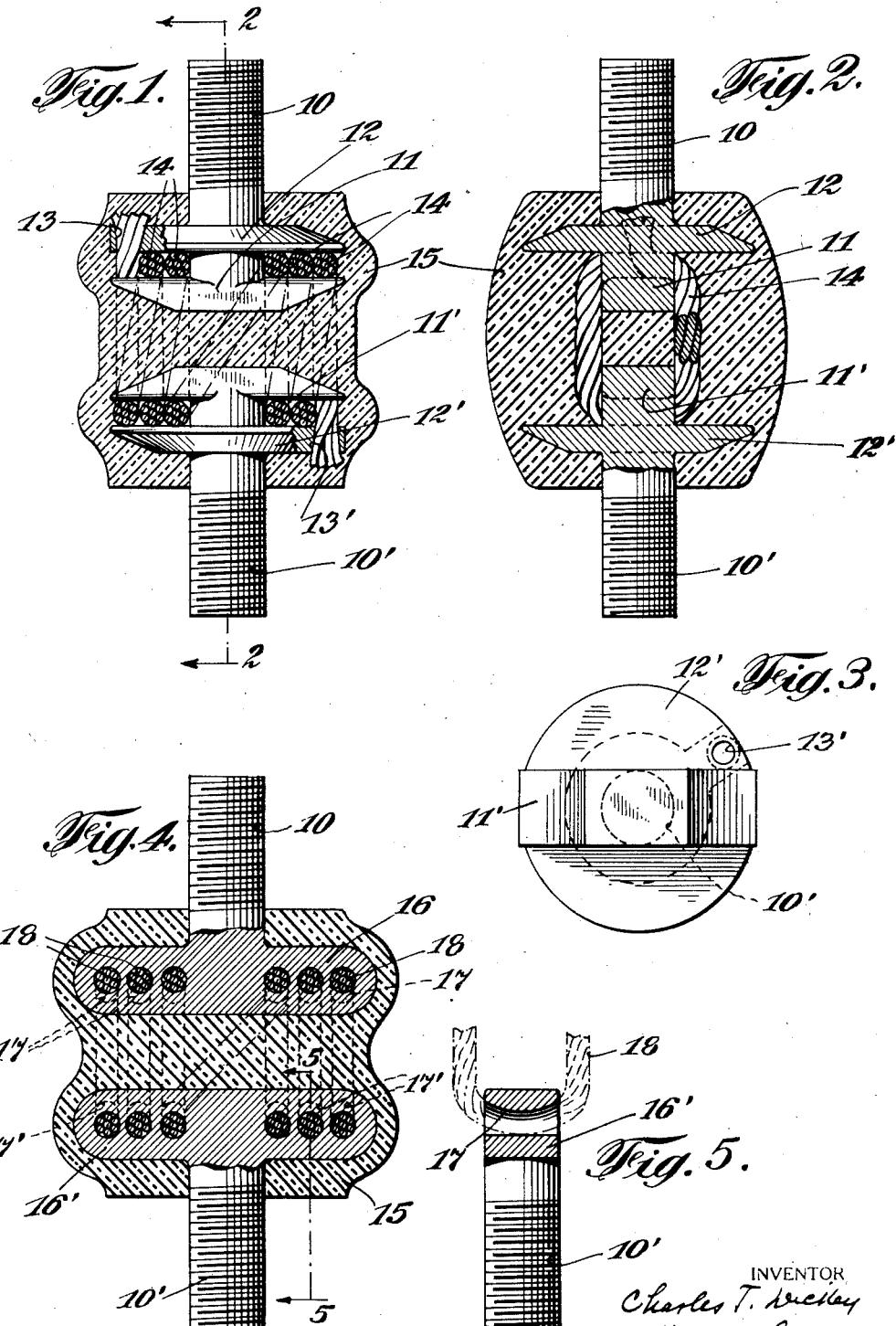
INVENTOR
Charles T. Dickey
BY
[signature]
his ATTORNEY Patented May 29, 1928.

1,671,764

UNITED STATES PATENT OFFICE.

CHARLES T. DICKEY, OF ELIZABETH, NEW JERSEY, ASSIGNOR TO RODIC RUBBER CO., OF GARWOOD, NEW JERSEY, A CORPORATION OF NEW JERSEY.

SPRING SHACKLE.

Application filed September 7, 1926. Serial No. 134,019.

My invention relates to spring shackles and refers particularly to resilient spring shackles.

In the construction of elliptic vehicle springs, it is necessary that the corresponding spring terminals of the two semi-elliptic members be connected or joined, together and that this jointure be of such a character as to allow a movement of the connected terminals with respect to each other during the compression and expansion of the spring during use.

This is usually accomplished by means of a bolt engagement, allowing a rotary movement of the spring member around the bolt when the spring is operating.

As one of the semi-elliptic spring members is attached to the chassis of the vehicle and the other is attached to the body, it is evident that any sudden movement, or shock, caused to the chassis by road in equalities will be transmitted almost in whole to the body of the vehicle, thus causing discomfort to the passengers.

The object of my invention is to prevent, or minimize, this shock transference by means of a resilient connection, or shackle, between the two semi-elliptic spring members.

A spring shackle is subjected to two general movements; a horizontal movement and a side thrust.

The horizontal movement is due to road inequalities which give a horizontal upwardly or downwardly movement to the chassis, and as these inequalities are frequently of considerable size, the body, or carriage of the vehicle is subjected to unpleasant horizontal vibrations.

The side thrust, or twist, is due to a sudden change in the direction of the moving vehicle, which causes the two spring terminals to separate from each other with a side twisting movement.

So-called shock absorbers of various kinds have been suggested and adopted to prevent the transmission of the chassis shock to the vehicle body, but their arrangement and construction must necessarily be different from a shackle adapted for the same purpose.

While the resilient properties of such substances as rubber are greatly desirable in spring shackles, it is evident that it is not safe to depend solely upon such resilient substances as a locking, or connecting, means between the spring terminals, because of their liability to split, or break, under the constant, and at times violent, movements of the terminals.

I have overcome the many objectionable features of metallic shackles while obtaining the desirable qualities of a resilient material and, at the same time, retaining the permanency of terminal connection incident to metallic shackles.

In the device of my invention, the two semi-elliptic spring members have their terminals separated from each other by a resilient material, as rubber, and hence, are receptive to the shock absorbing or cushioning properties of such substances, while at the same time the terminals are fastened together by means other than the resilient substance, the movement of the terminals being retained within limits which will not allow of the disruption of the resilient cushion, and which will retain the terminals in connection even if the resilient cushion should be torn or broken.

In the accompanying drawings illustrating modified forms of the device of my invention, similar parts are designated by similar numerals.

Figure 1 is a side view of one form of a device of my invention, partly in vertical cross-section for purposes of explanation.

Figure 2 is a cross-section through the line 2—2 of Figure 1.

Figure 3 is a top view of the lower spring terminal member of Figure 1.

Figure 4 is a side view of a modified form of my device, partly in vertical cross-section for purposes of explanation.

Figure 5 is a cross-section through the line 5—5 of Figure 4.

The particular form of the device of my invention shown in Figures 1, 2 and 3 of the accompanying drawings comprises a threaded member, or bolt, 10, having an elongated head, or cable supporting member, 11. Carried by the bolt 10 and spaced from the head 11 is an annular anchoring member 12. A similar bolt, indicated by prime numerals, is in alignment with the described bolt, the heads of the two bolts facing each other and being spaced from each other. The anchoring members, 12 and 12′ have holes 13 and 13′ for purposes described later.

A wire cable 14 is passed around the two heads 11 and 11', the ends of the cable being passed through the holes 13 and 13' and fixed therein to prevent their removal therefrom.

The device thus formed is imbedded as indicated, within a rubber casing, or cushion, 15.

In the modified form of my device shown in Figures 4 and 5, the threaded bolts 10 and 10' have the heads 16 and 16' each having a plurality of radial holes 17, 17' through which the cable 18 is passed and the ends fixed thereto. This form of device is imbedded, as indicated, within a rubber casing, or cushion, 15.

In use, the bolts 10, 10' are threaded within, or otherwise attached to, the two vehicle spring terminals, not shown.

A consideration of the device of my invention shows that any vertical movement of the spring terminals transmitted into a vertical movement of the bolts will be retarded by the rubber casing, and that the separation of the two bolts with respect to each other will be limited by the cable 14 or 18.

It is, therefore, impossible for the two bolts 10 and 10' to become entirely disengaged from each other without a complete breakage of the cable.

The construction of my device allows of the resiliency incident to the rubber enclosing the moving parts, while at the same time preventing the disruption of the device and the separation of the moving parts due to any violent horizontal movement or to any side movement, or twist, caused by a sudden change in direction of the moving vehicle.

I do not limit myself to the particular size, shape, number, arrangement, or material of parts as shown and described, as these are given simply as a means for clearly describing the device of my invention.

What I claim is:—

1. In an elliptic spring shackle, in combination, a resilient cushion, two oppositely opposed bolts partly within the cushion, an anchoring member carried by each bolt within the cushion and means within the cushion connecting the two bolts.

2. In an elliptic spring shackle, in combination, a resilient cushion, two oppositely opposed bolts partly within the cushion, an anchoring member carried by each bolt within the cushion and a cable within the cushion connecting the two bolts.

3. In an elliptic spring shackle, in combination, a resilient cushion, two oppositely opposed and spaced metallic members within the cushion and extending partly therefrom, a cable supporting member carried by each metallic member and a cable connecting the two cable supports.

4. In an elliptic spring shackle, in combination, a resilient cushion, two oppositely opposed and spaced metallic members within the cushion and extending partly therefrom, an anchoring member carried by each metallic member within the cushion, a member capable of carrying a flexible connecting member carried by each metallic member within the cushion and a flexible member connecting the two carrying members.

Signed at New York city in the county of New York and State of New York this 1st day of September, 1926.

CHARLES T. DICKEY.